United States Patent [19]

Corrales

[11] Patent Number: 4,864,335
[45] Date of Patent: Sep. 5, 1989

[54] PANORAMIC CAMERA

[76] Inventor: Richard C. Corrales, 7355 College Ave., Whittier, Calif. 90602

[21] Appl. No.: 243,517

[22] Filed: Sep. 12, 1988

[51] Int. Cl.⁴ .............................................. G03B 37/00
[52] U.S. Cl. ....................................... 354/99; 354/82; 354/69
[58] Field of Search ....................... 354/81, 82, 94, 95, 354/96, 98, 99; 352/69, 70, 243

[56] References Cited

U.S. PATENT DOCUMENTS

| | | | |
|---|---|---|---|
| 2,349,931 | 5/1944 | Back | 354/98 |
| 3,240,140 | 3/1966 | Hearon et al. | 354/99 |
| 3,374,721 | 3/1968 | Van Praag | 354/99 |
| 4,241,985 | 12/1980 | Globus et al. | 354/99 |

FOREIGN PATENT DOCUMENTS

| | | | |
|---|---|---|---|
| 1316839 | 3/1962 | France | 354/293 |
| 2066973 | 7/1981 | United Kingdom | 354/94 |

Primary Examiner—L. T. Hix
Assistant Examiner—Brian W. Brown

[57] ABSTRACT

An improved panoramic camera of the type having a camera which turns as the film is drawn therethrough. The improved panoramic camera has a handle which contains a drive motor. A pulley is located on the handle and also on the base of the take-up spool. As the motor turns the camera, the belt between the two pulleys turns the take-up spool pulling the film past the slit in the camera in a timed manner.

15 Claims, 3 Drawing Sheets

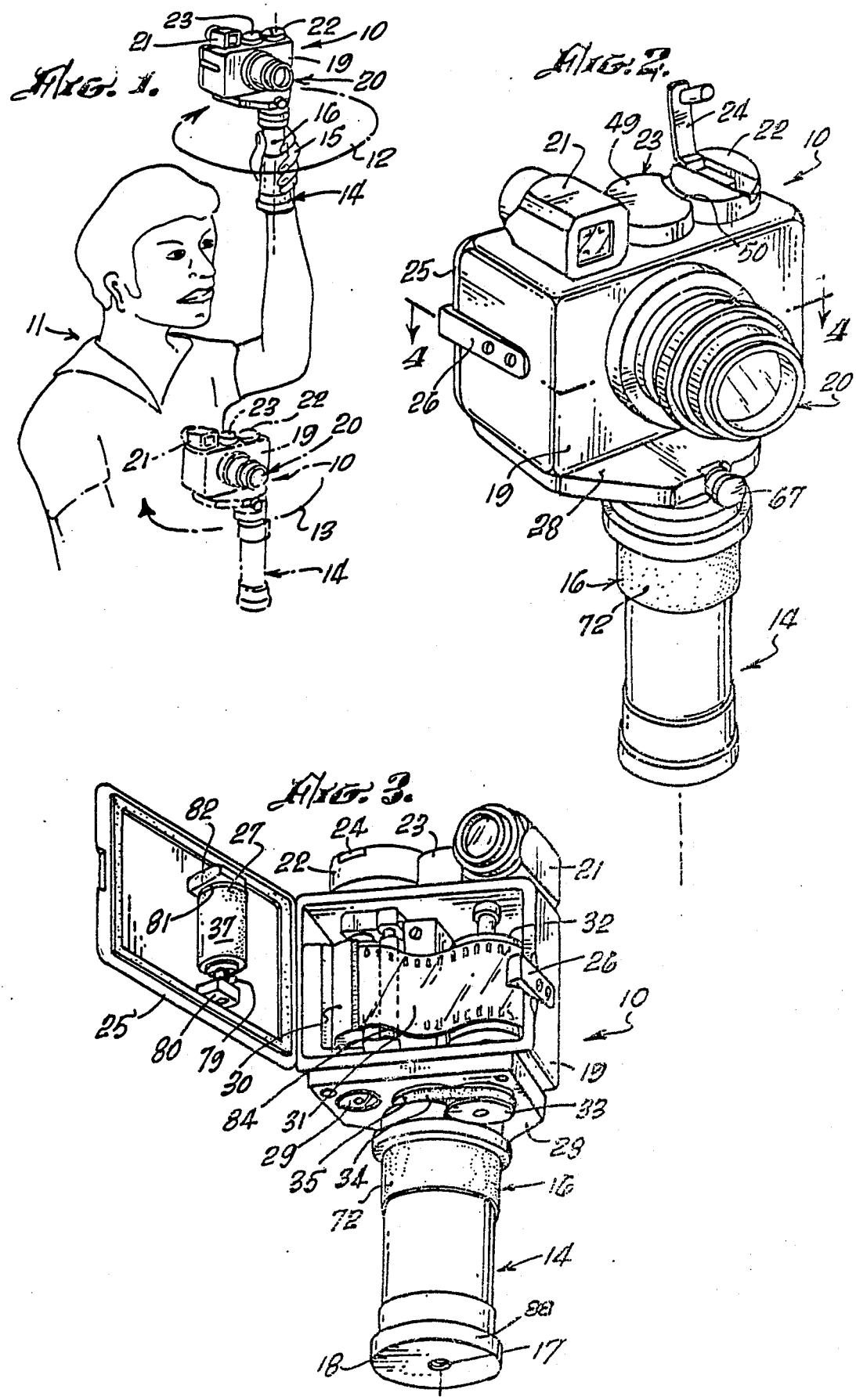

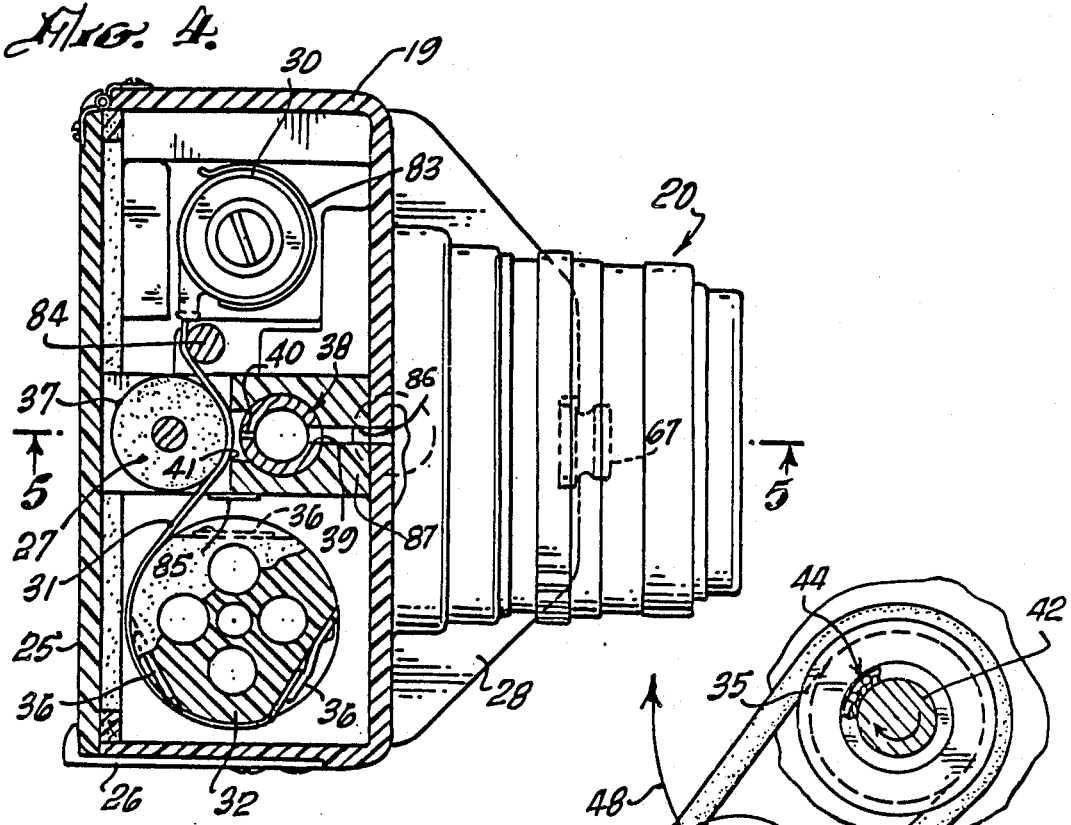
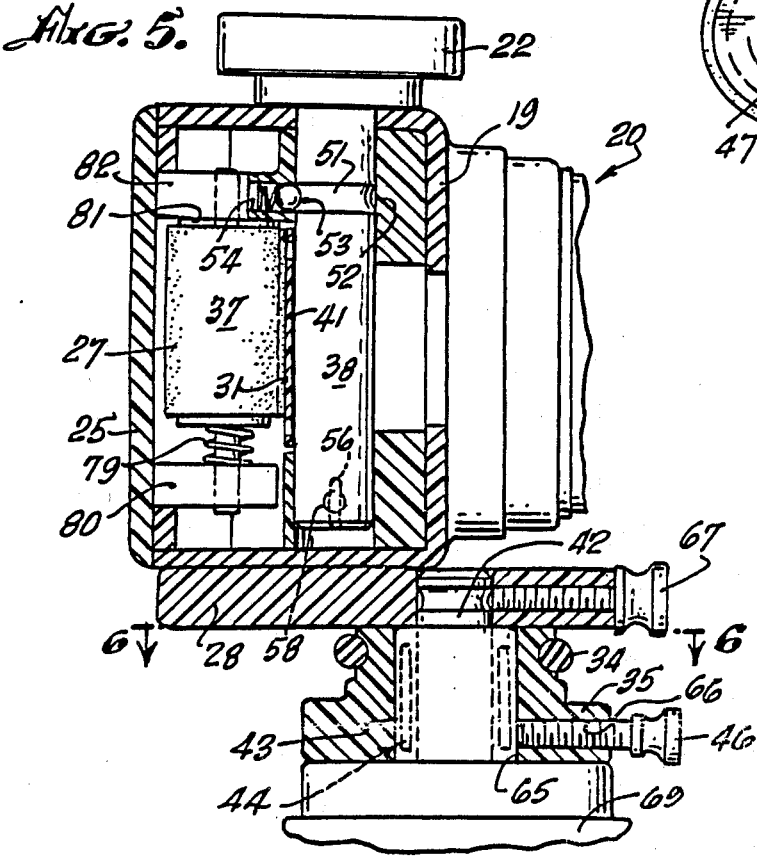

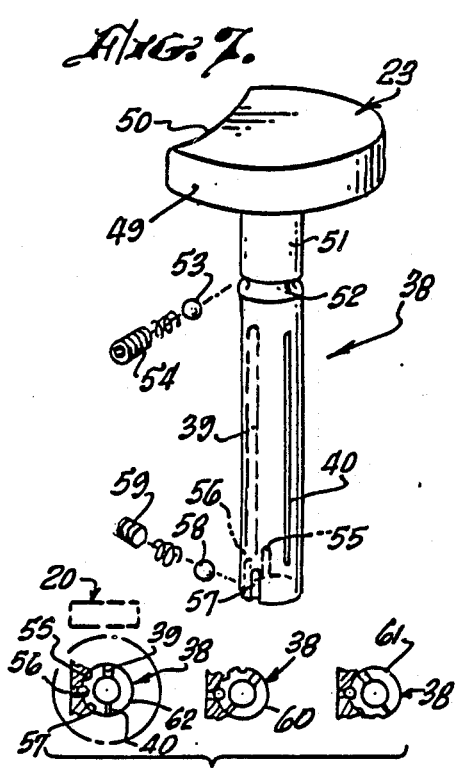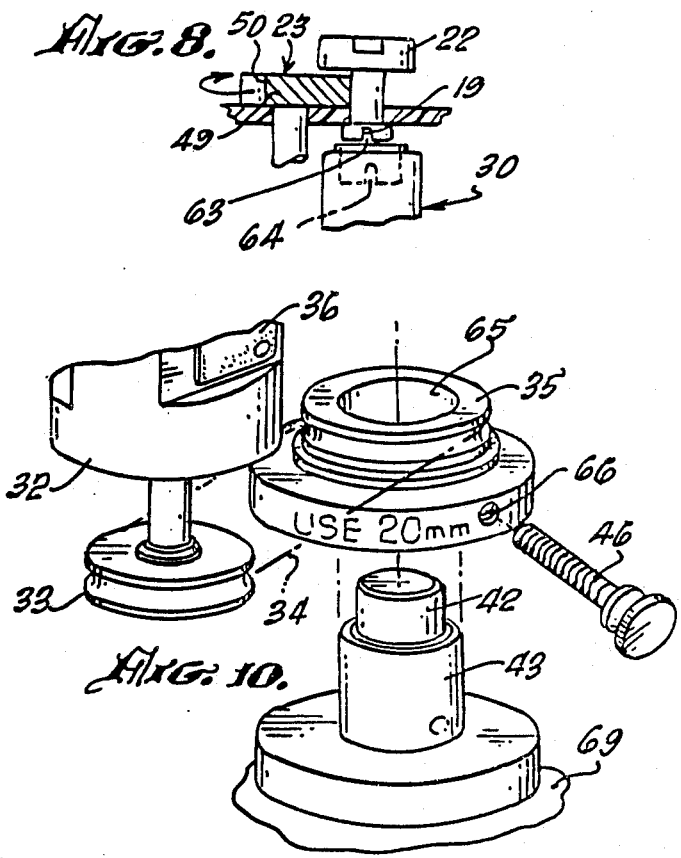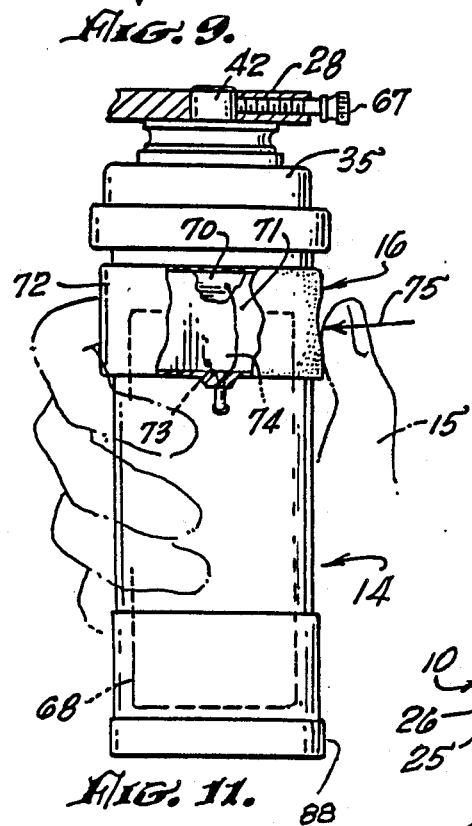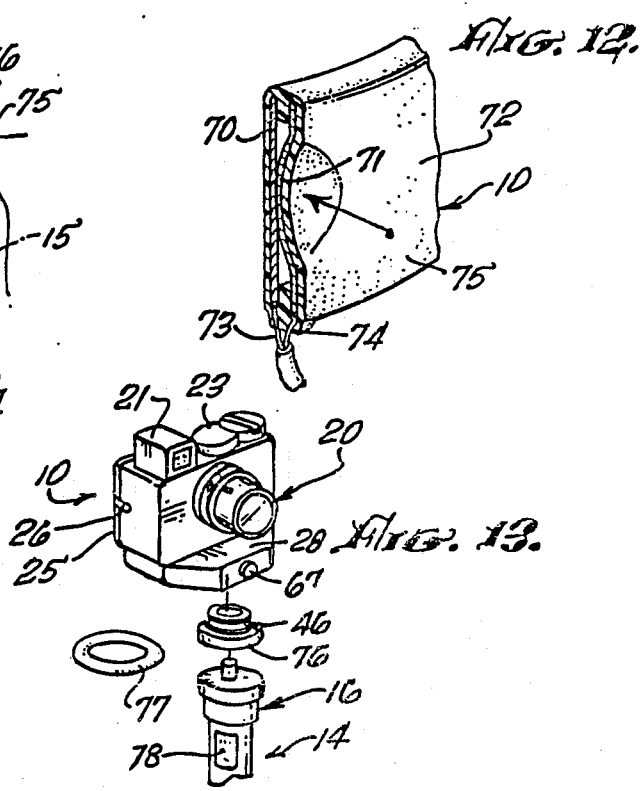

PANORAMIC CAMERA

BACKGROUND OF THE INVENTION

The field of the invention is photography, and the invention relates more particularly to panoramic cameras. Panoramic cameras have been known for more than 100 years. Panoramic cameras capable of forming an image without banding have, heretofore, required very expensive construction such as that shown in U.S. Pat. No. 4,241,985 to Globus. Because of the cost of such cameras, panoramic photography is not available to the hobbyist. Instead, the common approach is to take a plurality of still photographs which can then be cut and placed together in a frame to provide a panoramic effect. Another disadvantage of prior art designs is their use of a single fixed lens. Since interchangeable lenses, particularly for 35 mm cameras, are in widespread use, it is highly advantageous to permit the photographer to use the lens from his normal still camera and to place this in a panoramic camera body.

SUMMARY OF THE INVENTION

It is, thus, an object of the present invention to provide a reasonably priced panoramic camera.

It is another object of the present invention to provide a panoramic camera which utilizes standard, removable 35 mm camera lenses.

The present invention is for an improved panoramic camera of the type having lens means, a camera body which holds a roll of film, a take-up reel, a slit assembly for masking an image on a roll of film when it has been placed in the camera body and means for rotating the camera body while simultaneously passing the film past the slit to place a panoramic image on the film. The improvement of the present invention comprises film transport means timed by driving the film take-up spool. The transport means comprises means for driving the film take-up spool comprising a handle assembly including a battery-driven motor and motor switch means. The motor has an output shaft affixed to the camera body. A handle pulley is affixed to the handle assembly and a spool pulley is affixed to the take-up spool. A drive belt is connected between the handle pulley and the take-up spool pulley. Thus, when the motor switch is turned on, the motor shaft rotates the camera body while the handle assembly remains stationary. The camera body and the take-up spool pulley rotate about the handle, and the take-up spool pulley is turned by the drive belt between the handle pulley and the take-up spool pulley. The take-up spool pulls the film past the slit of the slit assembly. The take-up spool diameter and the two pulley diameters are sized in conjunction with the focal length of the lens so that the image and the film move at an identical rate of speed to provide a sharp image on the film. Preferably, the handle pulley and drive belt are removable, and a different size handle pulley and belt are provided so that lenses of different focal lengths can be used. Preferably, the motor switch is a band switch which wraps around the camera so that it may be energized easily in any position. In an improved configuration, the slit assembly has a handle which extends above the camera body. The handle has a notch which is positioned so that the rewind spool can be energized only when the slit is closed so that the exposed film cannot be reexposed by mistake. The improved film transport mechanism includes a film backup roller positioned directly behind the slit, and a slight amount of drag is provided in the film backup roller.

BRIEF DESCRIPTION OF THE DRAWINGS

FIG. 1 a perspective view showing two views of the panoramic camera of the present invention in conjunction with the user.

FIG. 2 is an enlarged perspective view of the panoramic camera of FIG. 1.

FIG. 3 is a perspective view showing the back and bottom of the camera of FIG. 1 with the back cover in an open position.

FIG. 4 is a cross-sectional view taken along line 4—4 of FIG. 2.

FIG. 5 is a cross-sectional view taken along line 5—5 of FIG. 4.

FIG. 6 is a cross-sectional view taken along line 6—6 of FIG. 5.

FIG. 7 is an exploded perspective view of the slit assembly of the panoramic camera of FIG. 1.

FIG. 8 is a side view, partly in cross-section, showing the top of the slit assembly and the rewind knob of the panoramic camera of FIG. 1.

FIG. 9 is a top view showing the detent portion of the slit assembly of FIG. 7.

FIG. 10 is an exploded perspective view showing the top of the handle assembly and take-up spool drive assembly of the panoramic camera of FIG. 1.

FIG. 11 Is a side view of the handle assembly of the panoramic camera of FIG. 1.

FIG. 12 is a perspective view, partly in cross-section, showing the band switch of the handle assembly of the panoramic camera of FIG. 1.

FIG. 13 is an exploded perspective view showing the handle pulley and drive belt of the panoramic camera of FIG. 1.

DESCRIPTION OF THE PREFERRED EMBODIMENTS

The panoramic camera of the present invention is shown in perspective view in FIG. 1 and indicated by reference character 10. A user 11 is shown holding camera 10 in his left hand above his head in order to take a 360° scan picture. The 360° arrow is indicated by reference character 12. Camera 10 is also shown in a lower position indicating that the camera can be used to take a panoramic view of less than 360° such as that indicated by arrow 13 depicting a 180° panoramic picture. It can be seen that handle assembly 14 is grasped by the user's hand 15, and the switch 16 is easily squeezed by the user's thumb and forefinger to energize the rotation of camera 10 as set forth more particularly below. Handle 14 also, of course, can be affixed to a tripod as indicated by tripod opening 17 in bottom 18 of handle assembly 14.

Camera 10 is shown in enlarged perspective view in FIG. 2 where it can be seen that camera 10 has a camera body 19 which holds a lens means 20 which is preferably a removable lens assembly such as a Nikon lens. By providing a standard interchangeable lens, the user can utilize his high-quality normal lens substantially reducing the cost of the panoramic camera. Camera body 19 also supports a view finder 21, a rotatable rewind knob 22 and a slit assembly knob 23. The rewind knob 22 may be raised and has a conventional rewind handle 24.

Turning now to FIG. 3, the camera 10 is shown in perspective view with the back cover 25 opened. Cover 25 has a latch 26 and also supports a backup roller 27 which provides an important part of the film transport mechanism described in more detail below. Camera body 19 rests on a platform 28 which has a bubble level 29 in the bottom thereof to assist the leveling of the camera. It can also be seen in FIG. 3 that a film spool 30 is held within camera body 19, and the film 31 is wound around a take-up reel 32. A take-up reel pulley 33 extends below platform 28 and is, of course, connected to take-up reel 32 and rotates with it. A drive belt 34 passes around pulley 33 and also around a handle pulley 35. A drive belt made from an O-ring has proved particularly satisfactory.

Turning now to FIG. 4, the details of the film transport path are readily seen. It can be seen that take-up reel 32 is of a relatively large diameter and includes three clips 36. It can be seen that as take-up reel 32 is turned, it will draw film 31 over the surface 37 of backup roller 27, thus pulling it out of film spool 30. Preferably, backup roller 27 is provided with a slight amount of drag so that the film is held securely against the surface 37 of roller 27. The drag on roller 27 is provided by a spring 79 which is placed on a shaft support plate 80. A friction washer 81 is placed between the top of roller 27 and shaft support plate 82. Roller 27 should preferably be surfaced with a rubber or rubber-like material so that it will provide some grip against the back surface of the film. The film spool 30 is held within camera body 19 by a clip 83. Guide roller 84 helps assure that the film contacts the surface 37.

A slit assembly 38 is shown in detail in FIG. 7, but the slit portion thereof is shown in cross-sectional view in FIG. 4. It can be seen that the slit assembly has a large slit 39 closer to lens means 20 and a small slit 40 adjacent the emulsion surface 41 of film 31. A slit 86 is formed in block 87 which directs the light to slit assembly 38. The inner surfaces of slit 86 is coated with a flat or anti-glare material to eliminate reflection. Also, a light baffle 85 is affixed to block 87, as shown in FIG. 4, and extends to further eliminate light from slit 40 from further exposing the exposed film on roller 32.

Turning now to FIGS. 5 and 6, the means for turning the take-up reel is clearly depicted. As shown in FIG. 5, the camera body 19 (through platform 28) is held to a shaft 42 of the motor within handle assembly 14. Shaft 42 passes through a collar 43 which includes a one-way clutch 44 (also shown in FIG. 6) which prevents the reverse turning of shaft 42. A handle pulley 35 is secured to collar 43 by a thumb screw 46. This results in handle pulley 35 being held in a nonturnable relationship in respect to handle assembly 14. Thus, as the motor within handle assembly 14 is energized, shaft 42 turns, thus turning camera body 19 with respect to handle assembly 14. As the camera body turns, the drive belt 34 causes take-up pulley 33 to turn as shown best in FIG. 6. Take-up pulley 33 turns in the direction of arrow 47 while the camera, itself, turns in the direction of arrow 48.

The detail of construction of the slit assembly is shown best in FIGS. 7 and 9. Slit assembly 23 has a knob 49 which has a notch 50 which is used to assure that the rewinding of the film will not result in a double exposure as described below. Slit assembly 23 has a shaft 51 which includes a groove 52. Groove 52 is used in conjunction with a spring-loaded ball 53 held in the body of the camera by a set screw 54. This permits the slit assembly to be pulled upwardly from the camera for cleaning, but generally holds the slit assembly in the camera body. A series of three notches 55, 56 and 57 are formed in the bottom of shaft 51. These notches work in conjunction with a biased ball 58 held also by camera body 19 by a set screw 59. This provides for a detent position for three positions of slit assembly 23, namely: a closed position, indicated by reference character 60 of FIG. 9; a rewind position, indicated by reference character 61; and an open position, indicated by reference character 62.

Notch 50 is provided so that the rewind knob 22 cannot be engaged in the film spool or cartridge 30 unless notch 50 is turned so that knob 22 can move downwardly. Once the notch 50 is aligned with knob 22, the groove 63 can be moved downwardly so that it contacts ridge 64 of film cartridge 30. When knob 22 can be moved downwardly, the slit assembly 23 has been moved so that it is closed and no light can pass through slits 39 and 40.

The particular details of the connection of the handle pulley 35 with the handle assembly 14 is shown best in FIG. 10 where the large opening 65 in pulley 43 can be seen to fit securely over collar 43. Thumb screw 46 passes through threaded opening 66 and abuts collar 43. The extended portion of shaft 42 is secured to the camera body 19 by thumb screw 67 shown in FIG. 5. Thumb screw 67 abuts the extending portion of shaft 42.

The handle assembly is shown in side view in FIG. 11, and the battery 68 is indicated in phantom view as is the motor 69. The bottom 88 of handle assembly 14 may be unscrewed to change the battery 68. A particularly useful type of switch assembly is shown in FIGS. 11 and 12 comprising a band switch 16. Band switch 16 has a pair of conductors comprising beryllium copper bands 70 and 71 having a thickness of about 0.005 of an inch. Bands 70 and 71 are held in an extruded plastic channel 72 which holds the two bands apart. The circuit between the battery and the motor is completed when bands 70 and 71 contact one another. This is indicated diagrammatically in FIG. 11 where conductors 73 and 74 are shown in phantom view and are placed in the circuit between the battery 68 and the motor 69. When pressure is exerted on the exterior surface of band switch 16, as indicated by arrow 75, the bands 70 and 71 make contact, and the motor is started. In this way, the camera can be held in any position, and band switch 16 may be squeezed and the motor will turn on. It is useful that the band switch 16 subtends an arc of at least 180° so that if the camera is squeezed, for instance between the thumb and forefinger, one or the other will be in contact with the band switch. Of course, preferably, the band switch completely encircles the camera as indicated in FIG. 11.

Another important advantage of the design of the camera of the present invention is its ability to use lenses of different focal lengths. This is particularly useful in photographing scenery, as a different lens would be appropriate for a panoramic view from the top of a mountain as compared to a panoramic view within a canyon. A different focal length, however, causes the image to move at a different speed past the slit 40. In order to compensate for this, a different handle pulley 35 is used. Thus, in FIG. 13, handle pulley 35 has been removed and a larger handle pulley 76 is placed over collar 43. Also, a different drive belt, such as O-ring 77, must be used. The result is that the pulley, such as pulley 35, is marked with indicia as indicated in FIG. 10.

Another advantage of the design shown in the drawings is that film without sprocket holes can be used to provide a larger image. Furthermore, larger film, such as 220 film, can be used since there are no sprockets to limit film size.

Yet another feature of the design of the present invention is its ability to use different motor speeds. Different handle assemblies 14 can be provided, and in FIG. 13, a handle assembly 14' is used which has a different motor having a higher speed which would be used to film a panoramic view where there might be some movement during the time the camera is being turned.

It has been found that the use of a slit of 1 mm width is very satisfactory. The larger slit is less critical, and a slit having a width of one quarter of an inch has proved satisfactory. While the motor speed in the handle is not especially critical, motor speeds of 30 rpm and 120 rpm provide an excellent range of rotation speeds. It is also appropriate that markings, such as markings 78 in viewfinder 21, be provided to match the different lenses used with the camera body.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An improved panoramic camera of the type having lens means, a camera body which holds a roll of film, a handle assembly rotatably affixed to the camera body, a take-up reel, a slit assembly for masking an image on a roll of film when it has been placed in the camera body, and means for rotating the camera body while simultaneously passing the film past the slit to place a panoramic image on the film, wherein the improvement comprises:

film transport means timed by driving the film take-up spool, said film transport means comprising means for driving the film take-up spool comprising a handle assembly including a battery-driven motor and motor switch means, said motor having an output shaft affixed to said camera body, a handle pulley affixed to the handle and a spool pulley affixed to the take-up spool and a drive belt connecting the handle pulley and the take-up spool pulley whereby when the motor switch means is turned on, the motor shaft rotates the camera body while the take-up spool is turned by the drive belt so that the film is drawn past the slit at a speed so that the image moves at the same rate as the film producing a sharp panoramic image on the film.

2. The improved panoramic camera of claim 1 wherein said lens means is removable from the camera body and said handle pulley and drive belt are removable and replaceable so that lenses of different focal lengths can be used on the same panoramic camera body.

3. The improved panoramic camera of claim 2 wherein said lens means which is removable and said handle pulley and drive belt which are removable are color coded so that the user can easily determine which lens, handle pulley and drive belt go together.

4. The improved panoramic camera of claim 1 wherein said drive belt is an O-ring.

5. The improved panoramic camera of claim 1 wherein said motor switch means is a band switch which subtends an arc of at least 180° around about the upper end of the handle.

6. The improved panoramic camera of claim 5 wherein the band switch essentially completely surrounds the handle.

7. The improved panoramic camera of claim 1 wherein the handle assembly is removable and replaceable with a handle assembly containing a battery-driven motor which rotates at a different speed.

8. The improved panoramic camera of claim 1 wherein the output shaft of the battery driven motor is surrounded by a one-way clutch so that the camera will not turn in a reverse direction.

9. An improved panoramic camera of the type having lens means, a camera body which holds a roll of film, a handle assembly rotatably affixed to the camera body, a take-up reel, a slit assembly for masking an image on a roll of film when it has been placed in the camera body, and means for rotating the camera body while simultaneously passing the film past the slit to place a panoramic image on the film, wherein the improvement comprises:

film transport means timed by driving the film take-up spool, said film transport means comprising means for driving the film take-up spool comprising said handle assembly including a motor and motor switch means, said motor having an output shaft affixed to said camera body, a handle pulley affixed to the handle and a spool pulley affixed to the take-up spool and a drive belt connecting the handle pulley and the take-up spool pulley and a film backup roller comprising a roller positioned so that its axis of rotation is parallel to the slit of the slit assembly and its outer surface is spaced from said slit a distance just sufficient so that the film can pass between the film backup roller and the slit, and wherein the film backup roller has drag means so that it has no tendency to coast whereby when the motor switch means is turned on, the motor shaft rotates the camera body while the take-up spool is turned by the drive belt so that the film is drawn past the slit at a speed so that the image moves at the same rate as the film producing a sharp panoramic image on the film.

10. The panoramic camera of claim 9 wherein the slit assembly is rotatable about an axis parallel to the slit of the slit assembly.

11. The panoramic camera of claim 10 wherein the slit assembly includes a slit operating knob extending above the camera body to enable the turning of the slit assembly and wherein the knob is shaped so that it must be placed in a position so that the slit is closed when the film is rewound.

12. The panoramic camera of claim 11 wherein said slit assembly is removable by lifting upwardly on the slit assembly knob.

13. The panoramic camera of claim 11 wherein the camera includes a rewind knob extending above the camera body and said rewind knob being raiseable to a position where it does not engage the film spool and wherein said slit operating knob has a notch therein which permits the rewind knob to be lowered into an engaged position only when the slit operating knob is turned so that the slit is closed whereby the film cannot be exposed during rewinding.

14. The panoramic camera of claim 13 wherein the slit assembly is movable into three discreet positions, namely: an open position for taking a panoramic picture; a closed position for normal transportation of the camera and to change lenses; and a rewind position, and the three positions being indicated by detent notches and a detent pin.

15. A panoramic camera for taking a photograph over a wide angle by rotating while the photograph is being taken, said camera comprising:
- a camera body including means for attaching a lens assembly and including a hinged back cover;
- a slit assembly held by said camera body, said slit assembly including a vertical slit positioned near the focal point of the lens which is affixable to the camera body;
- a handle assembly including a battery-driven motor and a motor switch, said motor having an output shaft which is affixed to the camera body;
- a handle pulley affixed to the handle assembly at the upper end thereof;
- a film take-up reel supported by the camera body and having a take-up pulley affixed thereto, said take-up pulley being located below the camera body and aligned with the handle pulley;
- a drive belt affixed between the take-up pulley and the handle pulley;
- means for holding a film spool in said camera body; and
- a film backup roller held by said hinged back cover of said camera body, said film backup roller being positioned so that its axis of rotation is parallel to said vertical slit of said slit assembly, and said backup roller having a smooth cylindrical outer surface, and said backup roller being aligned so that its surface is spaced behind said vertical slit a distance so that the film may pass between the slit and the backup roller, and said backup roller having a slight drag against turning.

* * * * *